Aug. 9, 1932.  M. DOUTEUR  1,870,406
MOLDING MACHINE FOR THE PRODUCTION OF A CONTINUOUS INGOT
Filed Oct. 28, 1929   6 Sheets-Sheet 4

Aug. 9, 1932.   M. DOUTEUR   1,870,406
MOLDING MACHINE FOR THE PRODUCTION OF A CONTINUOUS INGOT
Filed Oct. 28, 1929   6 Sheets-Sheet 5

Patented Aug. 9, 1932

1,870,406

UNITED STATES PATENT OFFICE

MATHIEU DOUTEUR, OF LA PLAINE ST. DENIS, NEAR PARIS, FRANCE

MOLDING MACHINE FOR THE PRODUCTION OF A CONTINUOUS INGOT

Application filed October 28, 1929, Serial No. 402,898, and in Belgium October 31, 1928.

This invention relates to a molding machine used in the casting or melting of metals, especially steel, in the shape of ingots, in a continuous operation.

It has already been suggested to use melting machines of a continuous type in which a mold composed of juxtaposed elements connected together is made in the shape of two series of molding elements forming a closed circuit adapted to be moved simultaneously at the same speed as the metal which is contained in the mold. None of those machines however has given so far practical satisfactory results, the produced ingots being often provided with blowholes, and piping formed by the shrinkage of the molten metal.

This invention has for its object to avoid those inconveniences and to secure, economically and in a continuous manner a perfect ingot of a complete homogeneity and the metal of which has all the qualities of the metal obtained in an oven.

With this object in view, the invention essentially consists in the special arrangements and combinations of parts hereinafter fully described and pointed out in the appended claims.

Figure 3:
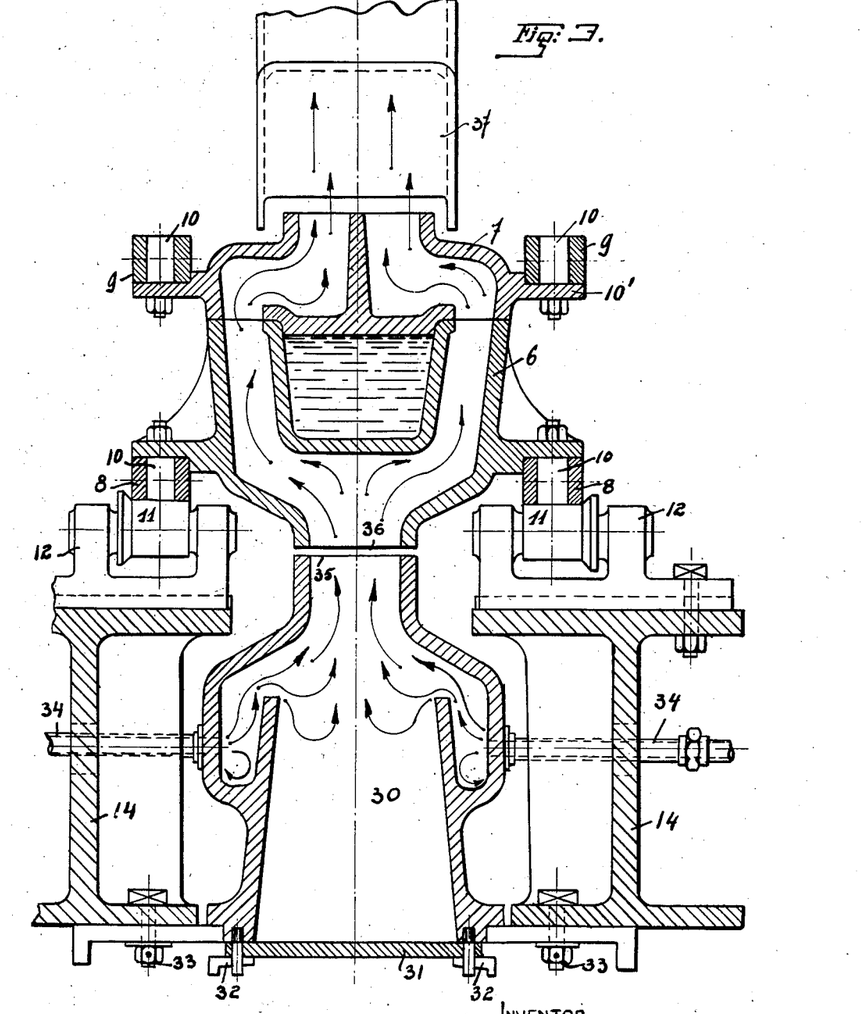
Figure 3 is a transverse section on an enlarged scale, taken through line III—III in Figure 1 and shows more especially a device for the distribution and for the circulation of the cooling air around the molding elements during the tapping operation.

The machine which is shown as an example is fed by a ladle 1 forming a decantation ladle which pours the molten metal through an inner pipe 2 into a smaller ladle 3 having a funnel shape, the bottom of which is in direct communication with a channel 4 having a slight slope and adducting the metal as close as possible to the level of the tapping into the mold. The latter is composed in a known manner of two series of superposed "molding elements" moving in closed circuit. This mold which is shown in detail on Figure 3 is formed of two series of elements 6 and 7 which cooperate in order to form the perimeter of the section of the ingot shown at 5 in Figures 1 and 2. The "mold elements" are provided with hollow walls or in other words are double walled in order to allow, as it will be explained hereinafter, a direct cooling, through the inner wall which is relatively thin of the molded steel which is contained in the juxtaposed elements.

The elements 6 and 7 have side flanges 10' to which lugs 10 are secured and which extend perpendicular to the flanges. These lugs are bolted to the flange 10' and are adapted to engage teeth on a power chain. The lugs extend into and are secured to lower and upper traction chains 8 and 9, by cross pins 8' extending through the lugs and the chain. These chains of traction 8 and 9 form each and independently of the molding elements, a whole of a perfect continuity in closed circuit.

For that reason and without interfering with the continuity of these chains, the elements 6 and 7 are practically interchangeable. In order to remove one element, it is only necessary to release four bolts of the lugs 10 fixed to the flanges 10¹ of those elements (Fig. 3). The molding elements are formed by pieces in raw material; the chains of traction require a relative finishing in view of the fact that their displacement takes place on rollers 11 mounted on bearings 12 which are in contact with those chains. The rollers 11 are placed at a sufficient distance one from the other in order to give to the molding elements a complete stability.

The chains of traction together with the molding elements pass round polygonal wheels 13 adapted to rotate freely. Each chain of traction with its polygonal wheels forms a complete whole mounted on frames 14 and 15. The lower and upper groups can be removed in one operation by means of a rolling bridge in case of a dismounting. This construction allows to remove a complete set of a continuous mold in two movements of the rolling bridge, either when it is necessary to change the type of the mold (the section) or only to replace elements.

The driving of the chains of traction on the rollers 11 is produced by means of secondary motive power chains 16 and 17.

Figures 6, 7:
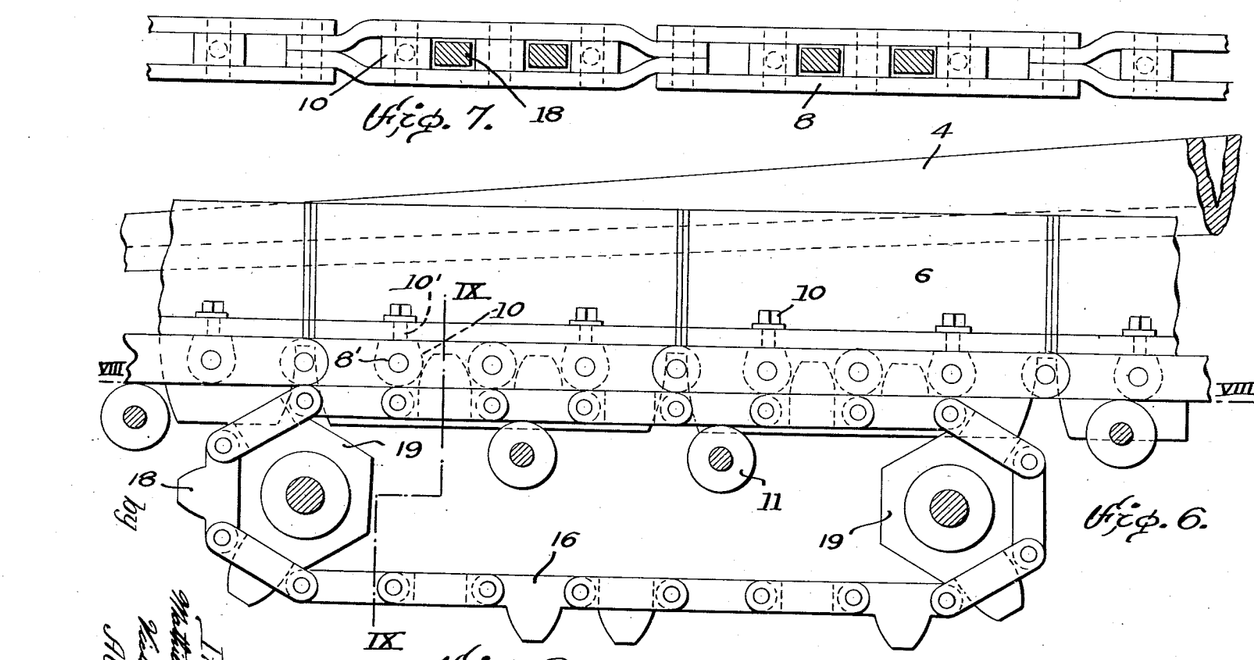
Figure 6 is a detail view, in elevation of the mechanical device used for producing the movement of the lower elements of the mold. The movement of the upper elements takes place in the same manner.
Fig. 7 is a half plan view corresponding to Figure 6.

Figure 6 shows the application of the said moving power chain 16 to the lower elements 6. The chain 16 is provided with a number of driving projections 18 having the shape of teeth which, when meeting the lugs 10 arranged at regular intervals, carry away the main chain of traction and all the elements forming part of one series.

Figures 1, 2:
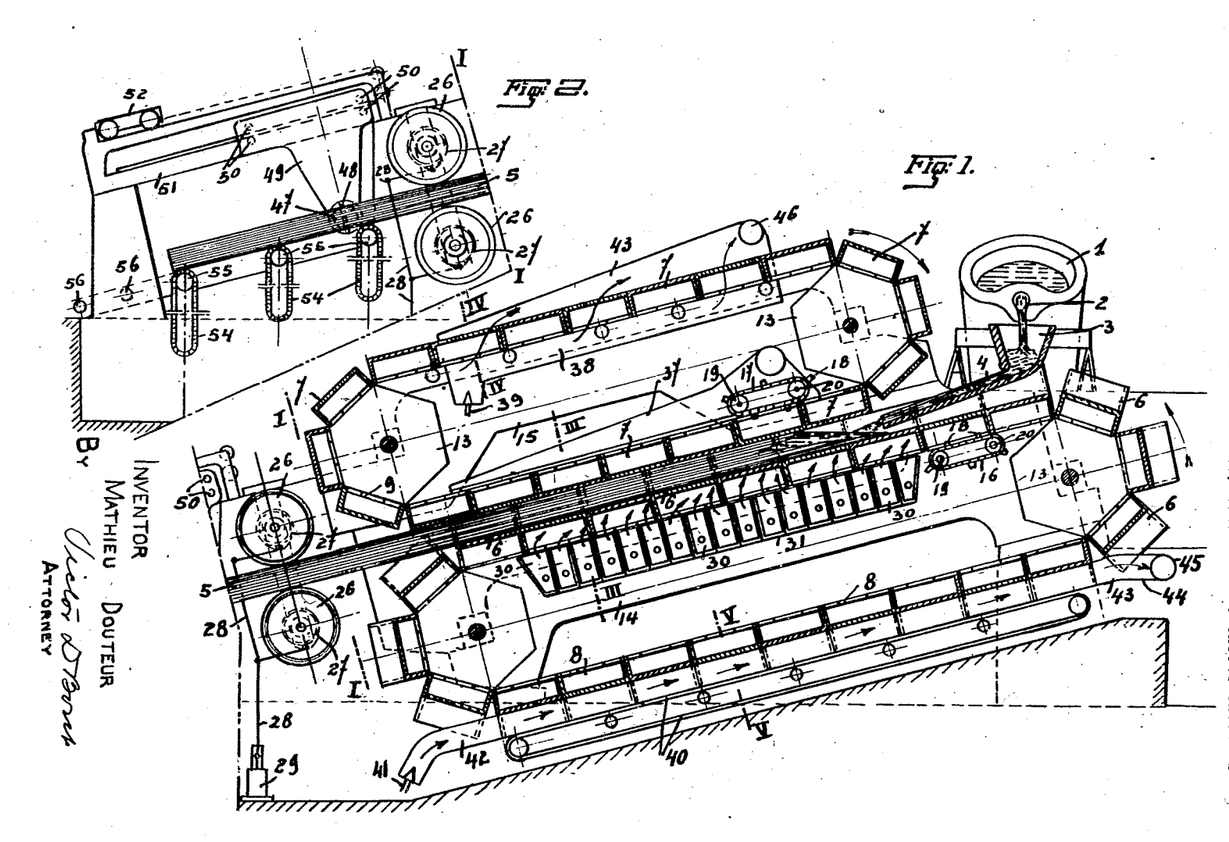
Figures 1 and 2 show schematically in vertical cross section the whole of the machine, the portion shown on Fig. 2 being connected to that shown on Fig. 1 according to line I—I.
Figure 8:
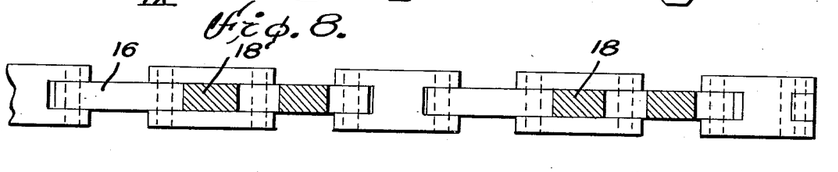
Figure 8 illustrates a sectional plan of the chain for driving the lower rollers of the mold, taken on the line VIII—VIII of Fig. 6.
Figure 9:
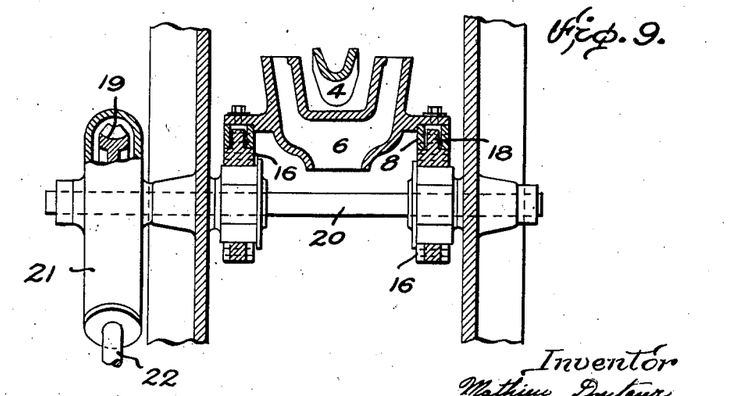
Fig. 9 is an enlarged fragmentary section taken on the line IX—IX of Fig. 6.
Figure 10:
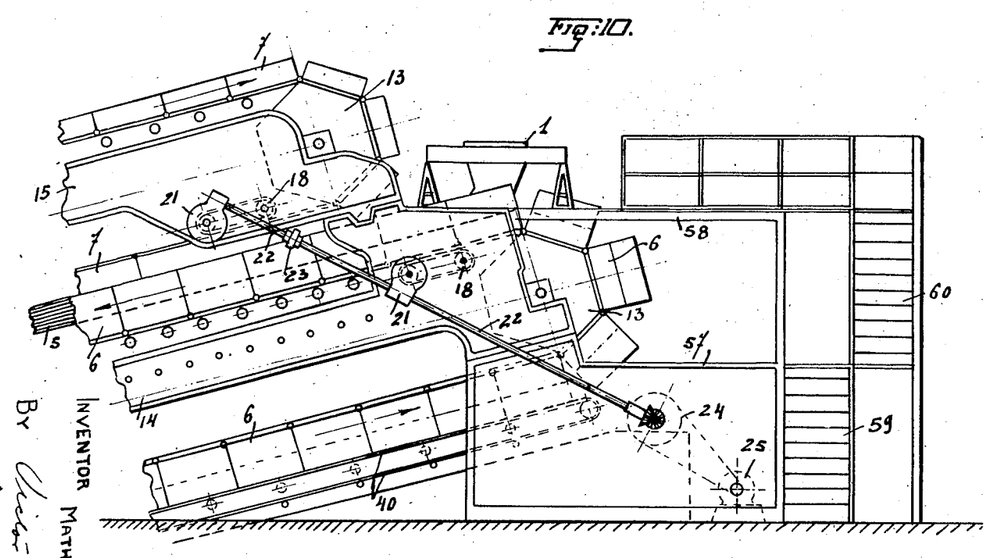
Fig. 10 is a side elevation view of one end of the machine showing different auxiliary devices and more especially the position of secondary chains securing the power of translation for the molding elements.

Figures 1 and 8 show the position of each of the two secondary chains 16 and 17 cooperating respectively with the chains 8 and 9. Each of the chains 16 and 17 is put into motion by means of a driving ratchet 19 and is guided by means of another ratchet 20.

The ratchets 19 are driven by means of speed reducers 21 (Fig. 8) of the worm type which are connected by means of a transmission shaft 22 comprising two parts connected by means of a coupling muffle 23 which allows to control the play of those chains.

The transmission shaft 22 extends towards the lower part of the molding machine where it is driven through a transmission 24, by means of an electric motor 25 which is preferably arranged outside the space where the manipulations necessary for the ingot productions are to be performed.

The function of the secondary driven chains 16 and 17 is not only to put into motion the chains of traction 8 and 9, but also to exert on the molding elements 6 and 7 a thrust of the said elements against each other so as to reduce to a minimum the space practically existing between these elements, such a space being a source of loses of molten metal.

The thrust thus exerted on the molding elements is transmitted to the ingot 5 which is in formation. This ingot further tends to be displaced by its own mass in the direction of movement of the mold, on the inclined plane on which the moving elements (mold and ingot) find only a slight passive resistance. The consequence is that in practice the continuous ingot must be held back. This action is secured by means of two hollow rollers 26 (Fig. 2) between which the continuous ingot is passed immediately when issuing from the mold. These rollers 26 are adapted to rotate freely with their shafts but are subjected to the action of two band brakes 27 which are keyed on the said shafts. The braking power of these brakes 27 is controlled by means of levers and rods 28 connected to the piston of a cylinder 29 which is submitted to a hydraulic pressure, or preferably to a pressure produced by compressed air.

The cylinder 29 is provided with a monometer in order to control the power of reaction exerted by the brakes 27 on the ingot 5 passing between the rollers 26. In order to avoid the heating of these rollers which are in permanent contact with the ingot, they are cooled by an inner ventilation produced by cold air which is circulated through the hollow shafts of the rollers.

Under the lower elements 6 of the mold, boxes 30 (Fig. 1 and 3) having in cross section the form shown on Fig. 3 are arranged. These boxes which are provided at the lower part with a lid 31 fixed by means of keys 32, in order to render possible an eventual cleaning, are fixed or suspended to the lower frame 14 by means of fastening bolts 33 allowing in case of necessity, a very easy dismounting. They are arranged in series, one box against the other, longitudinally with respect to the portion of the mold taking part to the molding (see Fig. 1) and are connected to pipes 34 through which they are fed with air under pressure preferably previously cooled. As shown more especially on Figure 3, in each of the boxes 30 the compressed air is expanded so as to produce supplementary lowering of the temperature; this air is expelled under the action of its pressure, towards the mouth 35 at the upper part of the box and immediately below the opening 36 of the mold, this opening having the same dimensions as the mouth 35 of the boxes 30. When passing through the opening 36 of the lower elements 6 of the mold, the air is divided into two currents which surround the molten metal contained in the said molding elements. This air afterwards passes similarly in the upper elements 7 of the mold where the two currents meet in order to form again a single jet of air. When issuing from the upper elements 7, the air is caught by means of a collector 37 arranged immediately above the mold. This collector is stationary and is separated from the body of the mold by a suitable space or play. A similar space or play exists between the openings 35 and 36 of the boxes 30 and of the lower elements of the mold which openings however are sufficiently close to each other in order to avoid any important escape of air under pressure.

Figure 4:
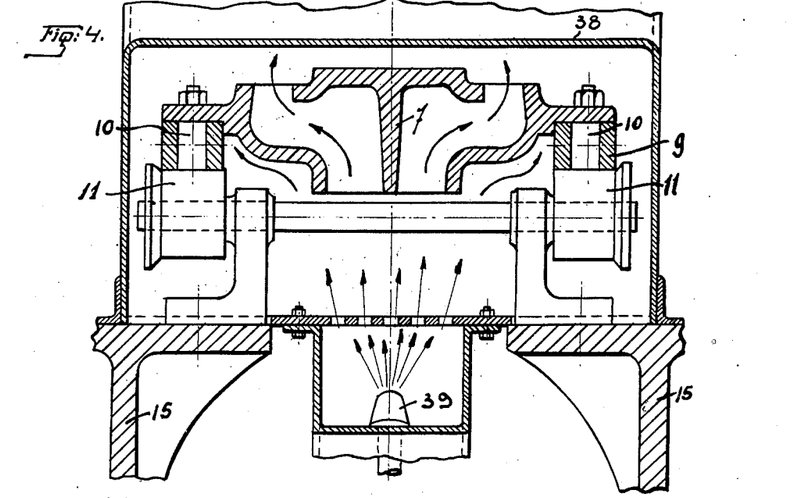
Figure 4 is a transverse section taken through line IV—IV in Figure 1 this figure shows more especially the complementary cooling device for the upper elements of the mold during their return travel after the stripping.

The device just described has for its object to submit the molten mass to a sudden cooling so as to produce the greatest possible contraction of the metal when passing from liquid to solid state. This cooling however is still insufficient in the case of a large production of ingots causing a progressive heating of the elements of the mold. In order to avoid this heating, the machine is provided with secondary cooling devices exerting their action on the molding elements before they are returned to their starting point, and are ready to begin a new operation. To this end, the upper elements 7 of the mold pass in a channel 38 in which circulates a current of air fed by a tuyère 39. (Figs. 1 and 4). This channel is fixed on the upper frame 15.

Figure 5:
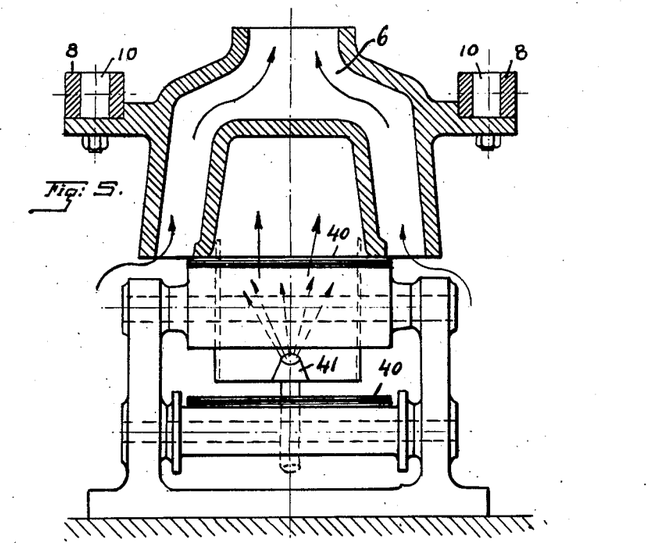
Figure 5 is a cross section taken through line V—V in Figure 1 and shows the complementary cooling device of the lower elements of the mold during their return travel after the stripping.

Figure 5 shows the corresponding device used in order to secure the supplementary cooling of the lower elements 6 of the mold. While the upper elements 7 are carried by the rollers 11, the lower elements 6 which do not lend themselves to a movement on rollers, are displaced at their return on a belt carrier 40 which forms with the lower elements 6 a long channel which is used for the ventilation of the elements.

The air is adducted to that channel by a tuyère 41 and an inlet nozzle 42; it is evacuated at the exit as heated air through a nozzle 43 and an outlet pipe 44.

The primary ventilation of the boxes 30 and the two secondary ventilations just mentioned, are made easy by means of a sucking exerted in the collectors 45, 46 and 44 which evacuate the quantity of air which has been used and which contains a great number of calories to a thermic central, in which the calories can be recovered for industrial purpose.

When the molding machine is in operation the ingot is delivered continuously; it is consequently not possible to stop it in order to cut it in given lengths and this cutting operation must take place during its displacement and gradually as it is delivered from the mold that is to say when it issues from between the rollers 26.

In order that the ingot may be cut according to various lengths, it is caught when issuing from between the rollers 26 between two pneumatic hammers 47 on each of which are mounted the shears 48 placed opposite one another, in the same plane (Fig. 2).

The cutting action of the shears 48 is controlled by means of cocks or taps for compressed air placed at hand of the workman.

Figure 11:
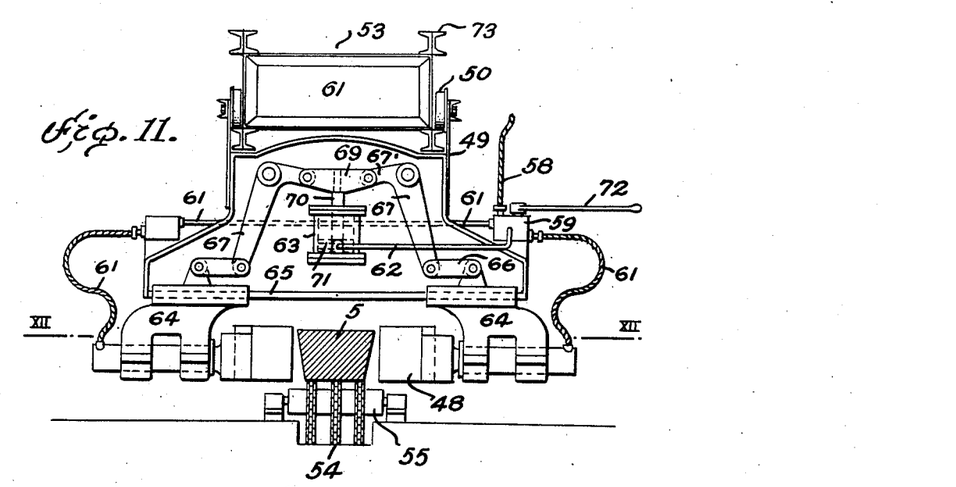
Fig. 11 is an end elevation of a pneumatic cutting device.
Figure 12:
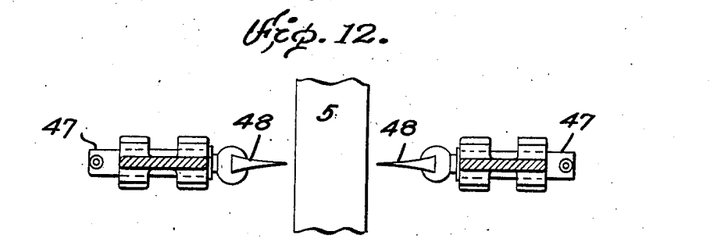
Fig. 12 is a fragmentary sectional plan of the same taken on the line XII—XII of Fig. 11.

These two pneumatic hammers are mounted on a frame work 49 which is suspended and which is displaced by means of rollers 50 rolling on a beam 51. The whole composed of the frame-work and of the pneumatic hammers is counterbalanced by a rolling counter-weight 52 connected to a cable 53. A distributor 59 is fed with compressed air by means of a flexible pipe 58. From the distributor 59, the compressed air is conducted to each of the pneumatic hammers 47 through pipes 61 and also to a cylinder 63 through a pipe 62. The hammers 47 carrying shears 48 are mounted in bearings 64 which are adapted to slide along guides 65. To each of the bearings 64 a lever 66 is connected, the lever 66 also being connected to a bell crank lever 67 which is adapted to oscillate around a pivot 68. The ends of the arms 67' of the levers 67 are connected together by a link 69 provided with a rod 70 connected to a piston 71 in a cylinder 63 to which compressed air is conducted. When compressed air is introduced in the cylinder 63, it raises the piston 71 and at the same time the link 69. This movement causes the oscillation of the levers 67 around the pivots 68 and the movement of the bearings 64 the one towards the other so as to produce the cutting of the ingot 5, by means of the shears 48. When the feeding of the compressed air into the distributor 59 is cut off, for instance, by means of the lever 72, the cutting movement of the shears 48 stops and the piston 71 descends under the force of gravity causing bearings 64 to move away from the ingot and the levers 69, 67 and 66 are brought to their initial position. Moreover, the counter weight 52 being a little heavier than the whole of the frame work 49, the whole of the system can be rapidly brought back when the shears are freed from the ingot. The shearing operation may thereafter begin. The counter weight can be displaced along the rails 73.

As the temperature of the continuous ingot is rather high (circa 1000° C. for steel) it is necessary to protect the rollers which convey it and which are in permanent contact with the ingot to be cut. This protection is secured by means of a sufficient number of ordinary chains 54 (Fig. 2) which form an endless ring and which are moving parallelly on conveying rollers 55. Owing to this arrangement, a very little portion of the chains 54 is momentarily submitted to the heat of the ingot, so that the remaining portion of these chains can be cooled at regular intervals.

Ordinary conveying rollers 56 which are less exposed to the heat, allow the ingot to continue its way on a horizontal platform which is arranged in the prolongation of the molding device. From the said platform, the ingots may be sent in all directions in order to be delivered immediately to the blooming and finishing mills without passing through reheating ovens.

As shown on Fig. 8, the molding machine is provided at one end with a floor 57 where the lower elements 6 are at proximity of the workman's hand to effect the eventual dismounting of a defective element. To this end, it must be observed that when the elements are passing over the polygonal wheels 13, they get disconnected, which allows of their being unbolted and of being rapidly and without any difficulty replaced. A second higher floor 58 allows in case of necessity the substitution of the head elements 7 of the mold; this floor 58 is also the working floor where the casting is effected. The access to these floors 57 and 58 is made easy by means of stairs 59 and 60 suitably placed near the points which are essential for the manufacture of the continuous ingot.

It is easy from the above description to realize the working as a whole of the described apparatus.

Before pouring the molten metal into the mold formed by the juxtaposition and the boxing of the elements 6 and 7, the mold must be stopped by means of a false ingot formed by a hollow beam, which is of the same section as the ingot and which will precede the latter in its displacement towards the conveying rollers.

This false ingot will detach itself then when leaving the said rollers. At the beginning of the melting, the ventilation or the cooling of the mold takes place and is effected in the manner already indicated by means of compressed and preferably cooled air which is adducted through the pipes 34 to the distributing boxes 30. In these boxes the air is expanded and produces a lowering of the temperature, pass round the ingot which is contained in the mold in passing through the double pipe with which the mold is provided and is finally caught by the collector 37.

When the molten metal, after having issued from the mold, has passed between the rollers 26 and has been stripped, it is subjected on the one hand to the thrust exerted on it by the molding elements and on the other hand to the braking action produced by the rollers 26.

This braking action is controlled in such a manner that not only it will be sufficient to maintain the ingot, but moreover it will exert on the ingot in formation a pressure which is necessary to secure a greater compactness of the internal metallic texture during the shrinking of the metal. Experiments will determine the value of the compression which will be directly proportionate to the strength to be given to secondary driving chains 16 and 17.

It will be observed that during the casting, the ingot is consequently submitted to the sudden cooling produced by the ventilation of the molding elements and to the compressing action produced—on the one hand by the thrust of the molding elements and on the other hand by the braking of the rollers 26.

The sudden cooling above mentioned enables the molten metal to be shrunk in a state of perfect homogeneity similar to that in which it would be produced in an oven which secures, in combination with the compression due to the combined action of the thrust of the molding elements and of the braking of the rollers 26 the radical removal of blowholes piping or segregation defects.

It is obvious that, in the case of a big production, the elements of the mold may progressively heat themselves in spite of the action of the draught of air used for the cooling of the ingot. As it has been explained hereabove, in order to avoid this inconvenience the molding elements are subjected to a supplementary cooling produced by the channels 38 and 40. This device allows a continuous working in the best possible conditions.

When issuing from between the rollers 26 the continuous ingot is delivered without any stoppage by the described cutting device while it is carried by the rollers 55 protected against the action of the heat by the chains 54.

What I claim is:

1. In a molding machine for the production of a continuous ingot direct from molten metal in combination: a mold-formed of two series of molding elements forming two endless chains adapted to box together and to separate for stripping the solidified ingot, means whereby the molten metal is submitted to a sudden cooling and simultaneously to a longitudinal compression, the said compression being produced by the combined action of a thrust on the ingot exerted by the molding elements and of a braking of the movement of the ingot, whereby the compactness of the inner metallic texture of the metal is increased during the shrinkage.

2. In a molding machine for the production of a continuous ingot direct from molten metal in combination a mold formed of two series of molding elements forming two endless chains, the said mold being provided with hollow walls in order to allow the circulation of a cooling agent and adapted to box together and to separate for stripping the solidified ingot, stationary distributing means for the cooling agent cooperating with the hollow parts of the molding elements, means whereby a longitudinal thrust is produced on the ingot by the molding elements, a braking device whereby the movement of the ingot is braked, the said device comprising two rollers between which the ingot is introduced when issuing from the continuous mold, the said rollers holding the ingot by the action of brakes arranged on the shaft of the said rollers whereby a reaction is produced on the ingots in a direction opposite to the thrust exerted on the ingot.

3. In a molding machine for the production of a continuous ingot direct from molten metal in combination formed two endless chains, molding elements fixed on the said endless chains adapted to box together and to separate for stripping the solidified ingot, the said molding elements being provided with hollow walls for the circulation of a cooling agent, stationary distributing means for the cooling agent cooperating with the hollow parts of the molding elements, means whereby the molten metal is submitted to a compression in its direction of travel, a ladle whereby the molten metal is poured into the mold, means whereby the said chains are driven, a braking device for the movement of the ingot, the said device comprising two rollers between which the ingot is introduced when issuing from the continuous mold, the said rollers holding the ingot by the action of brakes arranged on the shaft of the said rollers whereby a reaction is produced on the ingot in a direction opposite to the thrust exerted on the ingot and complementary cooling means acting on the molding elements during their return travel.

4. In a molding machine for the production of a continuous ingot direct from molten metal in combination a mold formed of two series of molding elements forming two endless chains adapted to box together and to separate for stripping the solidified ingot, fixed distributing boxes, means whereby a cooling medium is introduced in the said fixed boxes and is adapted to be expanded, means whereby the said medium is afterwards introduced in the hollow walls of the elements whereby the molten metal is submitted to a sudden cooling, and means whereby the metal is submitted simultaneously to a longitudinal compression, the said compression being produced by the combined action of a thrust on the ingot exerted by the molding elements and of a braking of the movement of the ingot, whereby the compactness of the inner metallic texture of the metal is increased during the shrinkage.

In testimony whereof I have affixed my signature.

MATHIEU DOUTEUR.